United States Patent
Barron

Patent Number: 5,835,528
Date of Patent: Nov. 10, 1998

[54] METHOD FOR FAST DETERMINATION OF PUESDO-NOISE CODE GENERATOR STATE

[75] Inventor: Kenneth S. Barron, Plano, Tex.

[73] Assignee: Texas Instruments Incorporated, Dallas, Tex.

[21] Appl. No.: 889,259

[22] Filed: Jul. 8, 1997

[51] Int. Cl.$^6$ .................................................. H04B 1/69
[52] U.S. Cl. .................................................. 375/200
[58] Field of Search .................................. 375/200, 208, 375/367; 331/78; 364/717.01

[56] References Cited

U.S. PATENT DOCUMENTS

| | | | |
|---|---|---|---|
| 4,776,012 | 10/1988 | Zscheile, Jr. et al. | 375/200 |
| 4,875,021 | 10/1989 | Sonetaka | 331/78 |
| 5,228,054 | 7/1993 | Rueth et al. | 375/200 |

*Primary Examiner*—Temesghen Ghebretinsae
*Attorney, Agent, or Firm*—J. Dennis Moore; James C. Kesterson; Richard L. Donaldson

[57] ABSTRACT

A method for setting the state of a clock-driven pseudo-noise sequence generator ("PNSG") having N stages, after the clock has been inhibited for a predetermined number K of clock cycles, to the state $S_2(D)$ the PNSG would have been had the clock not been inhibited, based on the state $S_1(D)$ the PNSG is in at the time inhibition of the clock is commenced. The method involves performing the following steps. First, a previously determined value, $a(D)$=the remainder of $D^{Kq}/f(D)$, is stored, wherein D is the delay transform operator, $q=2^N-2$, and $f(D)=c_1D^N+c_2D^{N-1}+\ldots+c_ND+1$. The product $S_2(D)=a(D)S_1(D)$ is formed, wherein $S_1(D)=s_{11}D^{N-1}+s_{12}D^{N-2}+\ldots+s_{1N}D^0$. If the degree of $S_2(D)$ does not exceed N−1, the state bit values for $S_2(D)$ are inferred from the product. However, if the degree of $S_2(D)$ exceeds N−1, the product $S_2(D)$ is first reduced by $f(D)$, and then the state bit values for $S_2(D)$ are inferred from the product.

4 Claims, 2 Drawing Sheets

FIG. 3
(PRIOR ART)
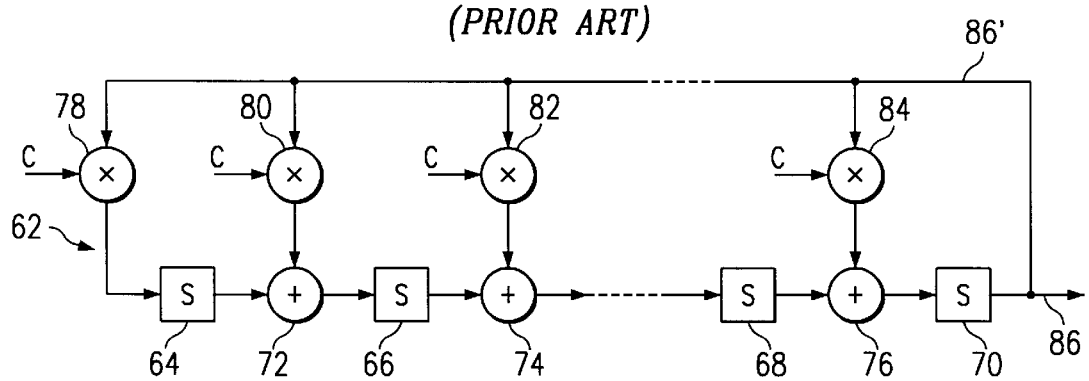
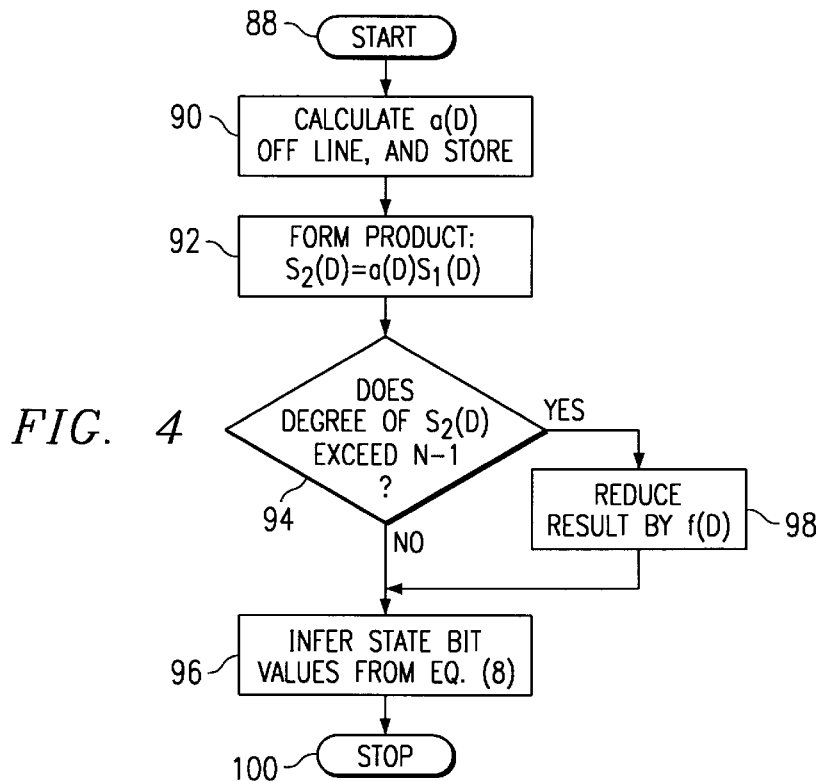
FIG. 4

METHOD FOR FAST DETERMINATION OF PUESDO-NOISE CODE GENERATOR STATE

TECHNICAL FIELD OF THE INVENTION

This invention relates to pseudo-noise sequence generators, and more particularly relates to a method for quickly determining a particular state of a PN code generator after its operation has been inhibited for a known period of time.

BACKGROUND OF THE INVENTION

Pseudo-noise ("PN") codes are finding increasing application, for example in the area of wireless telephony. In spread-spectrum communications, for example code division multiple access ("CDMA") telephony, a digital data stream (typically, digitized audio) is encoded using PN codes, to "spread" the spectrum of the signal transmitting the data. The digital data stream is decoded using the same PN code used to encode it at the transmitter.

By illustration, FIG. 1 is presented, showing is a block diagram of a portion of a CDMA receiver unit. Specifically, FIG. 1 shows pertinent blocks of a CDMA digital baseband functional unit 10 useful in understanding the present invention. The blocks shown are functional blocks, implemented primarily in software running on a digital signal processor ("DSP").

Thus, there is shown an Energy Estimator unit 18, a Searcher 20, and a Fingers unit 22, each of which receives the two-wide input line 12 as an input. The outputs of the Energy Estimator unit 18, Searcher 20 and Fingers unit 22, are provided to other functional units represented collectively by block 24, such as, for reception, rate detection, symbol alignment, Viterbi decoding, etc., and, for transmission, encoding, interleaving, etc. Voice signals are provided on line 14 to block 24. Signals from Estimator unit 18 are provided on line 26 to block 24. Signals from Searcher 20 are provided on line 28 to block 24. Signals from Fingers unit 22 are provided on lines 30 to block 24. A Transmit Processing unit 32 receives encoded data signals on line 34. The output of Transmit Processing unit 32 is provided on line 16.

A PN Code Generator unit 36 provides PN code signals on line 38 to Fingers unit 22, and on lines 40 to Transmit Processing unit 32. The PN Code Generator unit 36 receives control signals on lines 42 from block 24, and it receives clock signals from a Clock Generator 44 on lines 46. Clock Generator 44 also provides clock signals on lines 48 for various other clocked functions in functional unit 10.

In operation, as a receiver, functional unit 10 receives I and Q encoded data streams on two-wide input lines 12, provided from an RF front end unit (not shown), and performs various functions associated with CDMA reception, such as signal acquisition, rate determination, Viterbi decoding, digital-to-analog conversion, and the like. The I,Q encoded data is provided in the form of binary encoded sample values of the analog RF signal received at the RF front end, since the implementation of the functional unit 10 requires such binary encoded sample form for the data. Functional unit 10 is advantageously implemented in special purpose application specific integrated circuitry, with the exception of block 24.

As a transmitter, Functional unit 10 also receives voice signals on line 14, and performs various transmission functions, such as analog-to-digital conversion and encoding, and provides I,Q coded, spread-spectrum signals on two-wide output line 16 for modulation and transmission by the RF front end unit (not shown).

Specifically, the binary encoded sample values, of I,Q coded data, on line 12 are provided to Energy Estimator 18, which performs various operations on the data to estimate the average envelope strength of the received signal, and provides the result on line 26 for further processing. The binary encoded sample values, of I,Q coded data, on line 12 are also provided to Searcher 20, which performs various operations on the data to identify received signals for allocation to one of the Fingers 22, the data for such selection being provided to block 24 on line 28. Finally, the binary encoded sample values, of I,Q coded data, are provided on line 12 to Fingers 22 where some binary encoded values are selected and used in a decoding operation using a PN code provided on line 38 by PN Code Generator 36 to determine whether the PN Code Generator code signal is at the proper timing to decode the signal on line 12.

The PN Code Generator 36 also provides PN code signals, on lines 40, to the Transmit Processing Unit 32, which uses such PN code signals to spread-spectrum encode the digitized voice data, which may be Walsh encoded, e.g., provided on line 34 from block 24. The spread-spectrum signal resulting from this process is provided on output line 16.

All of the foregoing, in general, is well known in the spread-spectrum communications art. Further details of the various functional units of such a CDMA digital baseband functional unit 10, other than that of the PN code generator 36, are, therefore, not pertinent to an understanding of the present invention, and so, in the interest of clarity and brevity are not described in detail herein. The PN code generator 36, however, is pertinent, and is described further hereinbelow.

First, turning to a general discussion of PN codes, PN codes are generated by pseudo-noise sequence generators ("PNSGs"). One familiar apparatus used in PNSGs is a device known as a linear feedback shift register ("LFSR"). However, PNSGs are not limited to LFSRs. An PNSG is typically composed of a series of N stages, each stage including a memory element or memory step, depending on whether the PNSG is implemented in hardware or software, whose inputs are a linear combination (modulo 2) of the output memory element or step and previous memory element or step when viewed from a left-to-right perspective. The individual ones and zeros ("bits") of the output sequence of a PNSG, i.e., of a PN code, are sometimes referred to as "chips." A specific example of a PNSG 1 for N=4 is shown in FIG. 2. The PNSG 1 may be implemented in hardware, in which case FIG. 2 represents an LFSR, or it may be implemented in software, in which case FIG. 2 represents a structure for the logical flow of the method so implemented. Discussion below assumes software implementation.

In FIG. 2 can be seen the four memory steps 50, 52, 54, 56, as well as an adder 58 disposed between memory steps 54 and 56. The output of memory step 50 is provided to the input of memory step 52, the output of memory step 52 is provided to the input of memory step 54, while the output of memory step 54 is provided to one input of adder 58. The output of adder 58 is provided to the input of memory step 56, with the output of the PNSG being the output 60 of memory step 56. A feedback path 60' is also provided from the output 60 of memory step 56 to the input of memory step 50 and to the other input of adder 58.

The operation of the PNSG 1 shown in FIG. 2 can be described by either a state diagram or a table. The "state" of the PNSG 1 is the value of the bits stored in the memory steps at a specific time before, or after, a given iteration. Thus, for PNSG 1, the state at time "n" may be expressed as $S_n=s_1 s_2 s_3 s_4$, where $s_1$, $s_2$, $s_3$ and $s_4$ are the values of the bits stored in memory steps 50, 52, 54, 56, respectively. If the memory steps 50, 52, 54, 56, of PNSG 1 are initialized, at time $t_0$, with the state $S_0$=0001, the output and subsequent states of the PNSG are as shown in Table 1:

TABLE 1

| Clock Cycle or Iteration | State | Output |
|---|---|---|
| 0 | 0001 | 1 |
| 1 | 1001 | 1 |
| 2 | 1101 | 1 |
| 3 | 1111 | 1 |
| 4 | 1110 | 0 |
| 5 | 0111 | 1 |
| 6 | 1010 | 0 |
| 7 | 0101 | 1 |
| 8 | 1011 | 1 |
| 9 | 1100 | 0 |
| 10 | 0110 | 0 |
| 11 | 0011 | 1 |
| 12 | 1000 | 0 |
| 13 | 0100 | 0 |
| 14 | 0010 | 0 |
| 15 | 0001 | 1 |

With respect to Table 1, note that after the 15th iteration the state of the PNSG reaches that of the initial or 0th iteration. In fact, the output and state sequences of the PNSG repeat with a period of 15. For the case of N=4, this represents the maximum possible period since the all zeros state never occurs. Thus, in general, a PNSG is capable of generating a sequence of period (or, length) $2^N-1$, where N is the number of stages.

Not all PNSG configurations generate a sequence with the largest possible period, but those that do are said to generate a maximal length sequence or m-sequence for short. For the purposes of the present invention, PNSGs that generate m-sequences are of primary interest and hence discussion herein is focused on PNSGs having this property.

In CDMA applications it is sometimes necessary to determine the state of a PN code generator such that, when such state is loaded, the output sequence will begin at some desired point in the sequence. For example, if the PNSG of FIG. 1 is initialized with $S_0$=1010 instead of $S_0$=0001, the state and output sequences are as shown in Table 2.

TABLE 2

| Clock Cycle or Iteration | State | Output |
|---|---|---|
| 0 | 1010 | 0 |
| 1 | 0101 | 1 |
| 2 | 1011 | 1 |
| 3 | 1100 | 0 |
| 4 | 0110 | 0 |
| 5 | 0011 | 1 |
| 6 | 1000 | 0 |
| 7 | 0100 | 0 |
| 8 | 0010 | 0 |
| 9 | 0001 | 1 |
| 10 | 1001 | 1 |
| 11 | 1101 | 1 |
| 12 | 1111 | 1 |
| 13 | 1110 | 0 |
| 14 | 0111 | 1 |
| 15 | 1010 | 0 |

A related problem in the area of CDMA is as follows. Suppose the state $S_1$ of an PNSG is known at some particular time $t_1$. Assume that the clock to the PNSG is inhibited for K cycles. It is desired to know what the PNSG state, $S_2$, would be at time $t_2=t_1+KT$, where T is the clock period, had the operation of the PNSG not been inhibited. This situation occurs when the CDMA digital baseband functional unit 10 depicted in FIG. 1 is disabled (with the exception of block 24) for a known period of time, namely K clock cycles, to conserve power and thus extend battery life. It is necessary to quickly return the PNSG to the state it would have reached to avoid a time-consuming reacquisition and reinitialization process. In practice, however, the amount of processing required to determine the state $S_2$ may preclude its computation in a reasonable amount of time.

Accordingly, it is desired to have a method for determining such a state, $S_2$, rapidly. Further, it is desired to have such a method that provides $S_2$ rapidly enough to enable real-time state determinations to be made in CDMA applications. The present invention provides such a method.

SUMMARY OF THE INVENTION

The present invention provides a method for quickly determining a particular state of a PN code generator after its operation has been inhibited for a known period of time. The particular state to be determined corresponds to the state the PN code generator would have reached had its operation not been inhibited for the known period of time. The new state of the PN code generator is determined from the knowledge of its state just prior to the instant its operation is inhibited and the duration of time it is inhibited. The method of the present invention provides a method which will enable the new state calculation to be easily accomplished in real-time using state-of-the-art general purpose microprocessors and digital signal processors.

According the present invention, a method is provided for setting the state of a clock-driven pseudo-noise sequence generator ("PNSG") having N stages, after the clock has been inhibited for a predetermined number K of clock cycles, to the state $S_2(D)$ the PNSG would have been had the clock not been inhibited, based on the state $S_1(D)$ the PNSG is in at the time inhibition of the clock is commenced. The method involves performing the following steps. First, a previously determined value, $a(D)$=the remainder of $D^{Kq}/f(D)$, is stored, wherein D is the delay transform operator, $q=2^N-2$, and $f(D)=c_1 D^N+c_2 D^{N-1}+\ldots+c_N D+1$. The product $S_2(D)=a(D)S_1(D)$ is formed, wherein $S_1(D)=s_{11}D^{N-1}+s_{12}D^{N-2}+\ldots+s_{1N}D^0$. If the degree of $S_2(D)$ does not exceed N-1, the state bit values for $S_2(D)$ are inferred from the product. However, if the degree of $S_2(D)$ exceeds N-1, the product $S_2(D)$ is first reduced by $f(D)$, and then the state bit values for $S_2(D)$ are inferred from the product.

These and other features of the invention that will be apparent to those skilled in the art from the following detailed description of the invention, taken together with the accompanying drawings.

DESCRIPTION OF THE DRAWINGS

FIG. 3 is a block diagram of a generalized pseudo-noise sequence generator; and

FIG. 4 is a flow chart showing the method of the preferred embodiment of the present invention.

DETAILED DESCRIPTION OF THE PREFERRED EMBODIMENT

Figure 1:
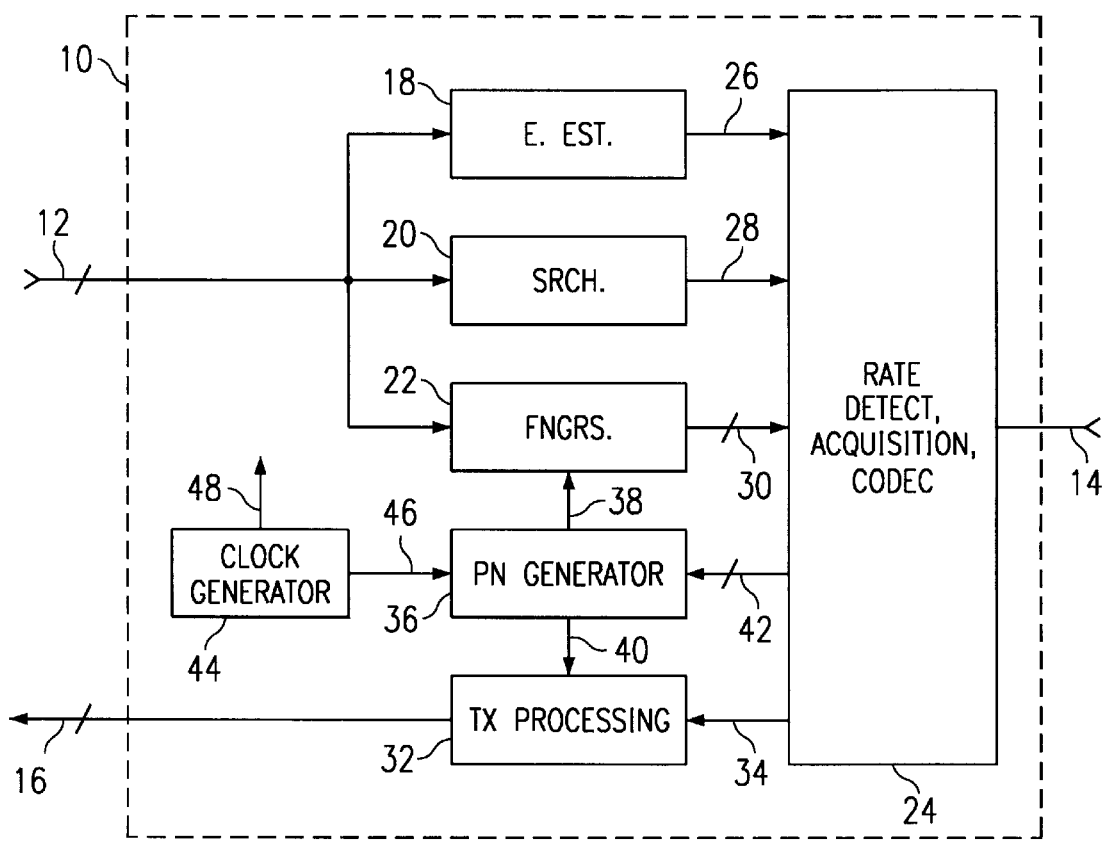
FIG. 1 is a block diagram showing pertinent portions of a code division multiple access ("CDMA") digital baseband functional unit.
Figure 2:
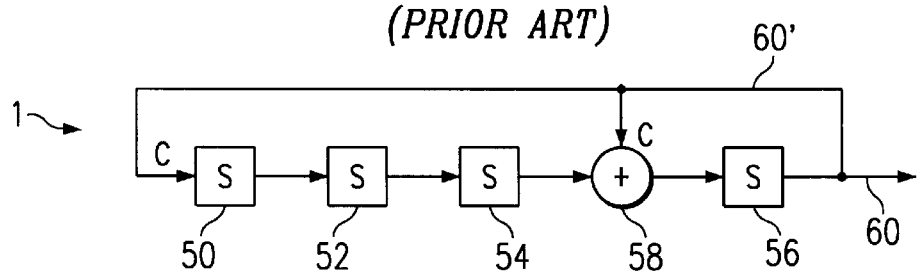
FIG. 2 is a block diagram of a four stage pseudo-noise sequence generator.

Recall that in the situation of interest it is supposed that the state $S_1$ of an PNSG is known after some iteration n, at a time $t_1$, and it is assumed that the clock to the PNSG is inhibited for K iterations (or, clock cycles—assuming one iteration per clock cycle). It is desired to know very rapidly what the PNSG state, $S_2$, would have been at iteration k=n+K, at a time $t_2$, had the clock not been turned off. Then, the state $S_2$ can simply be set in the PNSG, and operation resumed. The preferred embodiment provides such PNSG state, $S_2$, very rapidly as compared with the prior art, and permits its provision in real time CDMA applications by practice of the method in software instructions executed on a microprocessor, in particular, since multiplications are involved, a digital signal processor ("DSP").

FIG. 3 shows a generalized PNSG 62 with which the preferred embodiment of the present invention may be used. Of course, the preferred embodiment may be used with more specific instances of the arrangement shown in FIG. 3, with appropriate modifications to the application of the preferred embodiment based on the particular parameters of such specific instance. PNSG 62 has N stages or steps.

The PNSG 62 includes memory steps 64, 66, ..., 68, 70, for storing, after a given iteration, n, PN values $s_{n1}, s_{n2}, \ldots, s_{n(N-1)}, s_{nN}$, respectively. Also provided are addition steps 72, 74, ..., 76, and multipliers 78, 80, 82, ..., 84, as shown. The output of multiplier 78 is provided to the input of memory step 64. The output of memory step 64 is provided to one input of addition step 72, while the output of multiplier 80 is provided to the second input of addition step 72. The output of addition step 72 is provided to the input of memory step 66. The output of memory step 66 is provided to one input of addition step 74, while the output of multiplier 82 is provided to the other input of addition step 74, and so on, as shown, with the output end of PNSG 62 being interconnected such that the output of memory step 68 (having received as input the output of the previous stage's addition step) is provided to one input of addition step 76, while the output of multiplier 84 is provided to the second input of addition step 76. The output of addition step 76 is provided to the input of memory step 70. The output of memory step 70 is the output of the PNSG 62, which is the reference PN sequence output.

Constant $c_1$ is provided to one input of multiplier 78. Constant $c_2$ is provided to one input of multiplier 80. Constant $c_3$ is provided to one input of multiplier 82, and so on, as shown, while constant $C_N$ is provided to one input of multiplier 84. The output 86 of memory step 70 is provided to the other input to each of multipliers 78, 80, 82, ..., 84, via feedback path 86'. The output 86 of memory step 70 is also the output of the PNSG 62.

The output of the PNSG 62 after iteration n is y(n). The state, $S_n = s_{n1} s_{n2} S_{n3} \ldots s_{nN}$, of the PNSG 62 after iteration n, i.e., at time $t_1$, can be expressed as:

$$s_{n1} = c_1 y(n-1)$$

$$s_{n2} = c_2 y(n-1) + s_{n1}$$

.
.
.

$$s_{nN} = c_N y(n-1) + s_{n(N-1)}$$

This property of PNSG 62 is well known.

Now, turning to the preferred embodiment of the present invention, in the first step in finding the state $S_2$ of PNSG 62, I express the initial state $S_1$ as a polynomial in D, the delay transform operator. Defining $S_1 = s_{11} s_{12} \ldots S_{1N}$ and $S_1(D)$ as:

$$S_1(D) = s_{11}D^{N-1} + s_{12}D^{N-2} + \ldots + s_{1N}D^0, \quad (1)$$

the state of the PNSG 62 after K clock cycles, i.e., at time $t_2$, is given by:

$$S_2(D) = D^{-K}S_1(D) = s_{21}D^{n-1} + s_{22}D^{N-2} + \ldots + s_{2N}D^0 \quad (2)$$

from which I derive, below, the state $S_2$ at time $t_2$. Thus, in the second step I calculate the quantity $D^{-K}S_1(D)$ to determine the state at time $t_2$.

In Equation (2), the delay operator $D^{-K}$ has a negative exponent because the states of the PNSG 62 cycle through the elements of the extended Galois field $GF(2^N)$ in reverse order. Since the contents or state of the PNSG 62 represent elements of $GF(2^N)$, $D^{-1}$ may be considered as the multiplicative inverse element of D in $GF(2^N)$ so that $D^{-1} = D^{L-2}$ where $L = 2^N$. This means that:

$$D^{-K} = (D^{L-2})^K = D^{K(L-2)}, \quad (3)$$

and therefore I express Equation (2) as:

$$S_2(D) = D^{Kq}S_1(D) = s_{21}D^{N-1} + s_{22}D^{N-2} + \ldots + s_{2N}D^0, \quad (4)$$

where $q = 2^N - 2$.

Referring to Equation (3), it is clear that the exponent of the delay operator can be very large if the values of K and N are large, as they are in, for example, CDMA signal reacquisition circumstances. Consequently, in such cases the degree of $S_2(D)$ exceeds N−1, and so I reduce the result by f(D) where:

$$f(D) = c_1 D^N + c_2 D^{N-1} + \ldots + c_N D + 1, \quad (5)$$

and $c_n$, n=1, 2, ..., N, are the feedback coefficients of the PNSG 62 (FIG. 3). Reducing $S_2(D)$ by f(D) means to find the remainder of $S_2(D)/f(D)$; this involves long division of two polynomials in D with all mathematical operations carried out modulo 2. Once the remainder has been found, the state bit values at time $t_2$ are inferred from the coefficients of each term in $S_2(D)$ in accordance with Equation (4).

In applications of interest, e.g., in CDMA reacquisition circumstances, the values of K and N may be quite large, e.g., K=1,228,800 and N=42. For these values of K and N, and given an initial state vector $S_1 = s_{11}s_{12} \ldots s_{1N}$ implying a degree 41 polynomial $S_1(D)$, it is necessary to reduce $$S_2(D) = D^{1,228,800q}S_1(D) \quad (6)$$

$$= D^{4,398,045,282,303}S_1(D),$$

where $p = 2^{42} - 2$, by f(D) which is a degree 42 polynomial. The process of finding the remainder of $S_2(D)/f(D)$ in Equation (6) may require as many as 4,398,045,282,303 iterations, and assuming a digital signal processor (DSP) with an instruction time of 17 ns (60 MHz clock), finding the remainder could take up to 20.4 hours. This amount of processing time is prohibitive and precludes any straightforward use of the algorithm described thus far in real time.

However, note that the problem of determining the state of the PNSG at time $t_2$ for large K and N can be avoided, for the case when K is large but fixed; i.e., K is known a priori and does not change. Under these circumstances, I provide a method for finding $S_2$ from Equation (4), carried out in two stages, with the bulk of the processing performed once off-line and stored for use in the remaining real time stage.

This will now be explained. Defining:

$$a(D) = \text{Remainder of } \frac{D^{Kq}}{f(D)}, \quad (7)$$

which is the same as reducing Equation(3) by f(D), Equation (4) may be expressed as $$S_2(D)=a(D)S_1(D)=s_{21}D^{N-1}+s_{22}D^{N-2}+ \ldots +s_{2N}D^0. \quad (8)$$

The first, or off-line, step in the method involves calculating a(D) once using a general purpose digital computer without regard to how long it takes, provided it is practical to determine a(D) in the first place. The second, or real time, step involves calculating the product $a(D)S_1(D)$ in accordance with Equation (8) and subsequently reducing by f(D) if necessary. Since the degree of $S_2(D)$ in Equation (8) is at most 2N−1 prior to reduction by f(D), the number of iterations required in the long division process is decreased dramatically to a maximum of N−1. For the example using N=42, and not counting the work needed to find the product $a(D)S_1(D)$, the number of iterations required to find S2 is decreased from 4,398,045,282,303 to 41, with an associated processing time of 0.7 μs (60 MHz DSP). This represents an improvement of approximately 11 orders of magnitude when compared with a straightforward implementation as suggested by Equation (4), a truly enormous improvement.

In summary, the algorithm is as follows:

(1) Given the value of K, calculate a(D) off line and store for use in step (2);

(2) Form the product $S_2(D)=a(D)S_1(D)$ in accordance with Equation (8) and reduce the result by f(D) if the degree of $S_2(D)$ exceeds N−1; and (3) Infer the state bit values from the result of step (2) as suggested by the far right hand side of Equation (8).

FIG. 4 is a flow chart showing the method described above. Thus, the method starts 88 and, in the first step 90, given the value of K, a(D) is calculated off line, with the result being stored for use in the next step 92. In step 92, the product $S_2(D)=a(D)S_1(D)$ is formed in accordance with Equation (8). In step 94, it is determined whether the degree of $S_2(D)$ exceeds N−1. If it does not, then step 96 is performed, in which the state bit values are inferred from the result of step 92. If the degree of $S_2(D)$ does exceed N−1, then step 98 is performed, and the result is reduced by f(D), and then step 96 is performed. In either case, after step 96 is performed, the method stops 100.

The method just described is advantageously implemented in software. Given the need for multiplications, implementation in software for execution on a digital signal processor is considered preferred. Specific coding of the steps of the method disclosed hereinabove will vary, depending on the microprocessor on which the code is to execute. However, such encoding is well within the purview of those of ordinary skill in the art area to which the present invention pertains, once the principles of the present invention, as set forth herein, are understood.

Although the present invention and its advantages have been described in detail, it should be understood that various changes, substitutions and alterations can be made herein without departing from the spirit and scope of the invention as defined by the appended claims.

What is claimed is:

1. In a microprocessor, a method for setting the state of a pseudo-noise sequence generator ("PNSG") having N stages and being driven by a clock such that the PNSG changes state once for each clock cycle, each stage of the PNSG being at one of two states, after the clock has been inhibited for a predetermined number K of clock cycles, to the state $S_2(D)$ the PNSG would have been had the clock not been inhibited, based on the state $S_1(D)$ the PNSG is in at the time inhibition of the clock is commenced, comprising the steps of:

storing a previously determined value a(D)=the remainder of $D^{Kq}/f(D)$, wherein D is the delay transform operator, $q=2^N-2$, and $$f(D)=c_1D^N+c_2D^{N-1}+ \ldots +c_ND+1;$$

forming a product $$S_2(D)=a(D)S_1(D)$$

wherein $S_1(D)=s_{11}D^{N-1}+s_{12}D^{N-2}+ \ldots +S_{1N}D^0$; and if the degree of $S_2(D)$ does not exceed N−1, inferring the state bit values for $S_2(D)$ from said product, but if the degree of $S_2(D)$ exceeds N−1, first reducing the product $S_2(D)$ by f(D), and then inferring the state bit values for $S_2(D)$ from said product.

2. A method according to claim 1, wherein said method is performed by the execution of steps in a microprocessor.

3. A method according to claim 1, wherein said method is performed by the execution of steps by special purpose circuitry.

4. A method according to claim 1, wherein said method is performed by the execution of steps partially in a microprocessor and partially by special purpose circuitry.

* * * * *

UNITED STATES PATENT AND TRADEMARK OFFICE
CERTIFICATE OF CORRECTION

PATENT NO : 5,835,528
DATED : November 10, 1998
INVENTOR(S): Kenneth S. Barron

It is certified that error appears in the above-identified patent and that said Letters Patent is hereby corrected as shown below:

Title page, item [54] and col. 1, line 2,
In the title, change "PUESDO" to "PSEUDO".

Signed and Sealed this

Ninth Day of March, 1999

Q. TODD DICKINSON

*Attest:*

*Attesting Officer*   Acting Commissioner of Patents and Trademarks